(Model.)
J. F. WHITESCARVER.
ANIMAL POKE.
No. 301,781. Patented July 8, 1884.
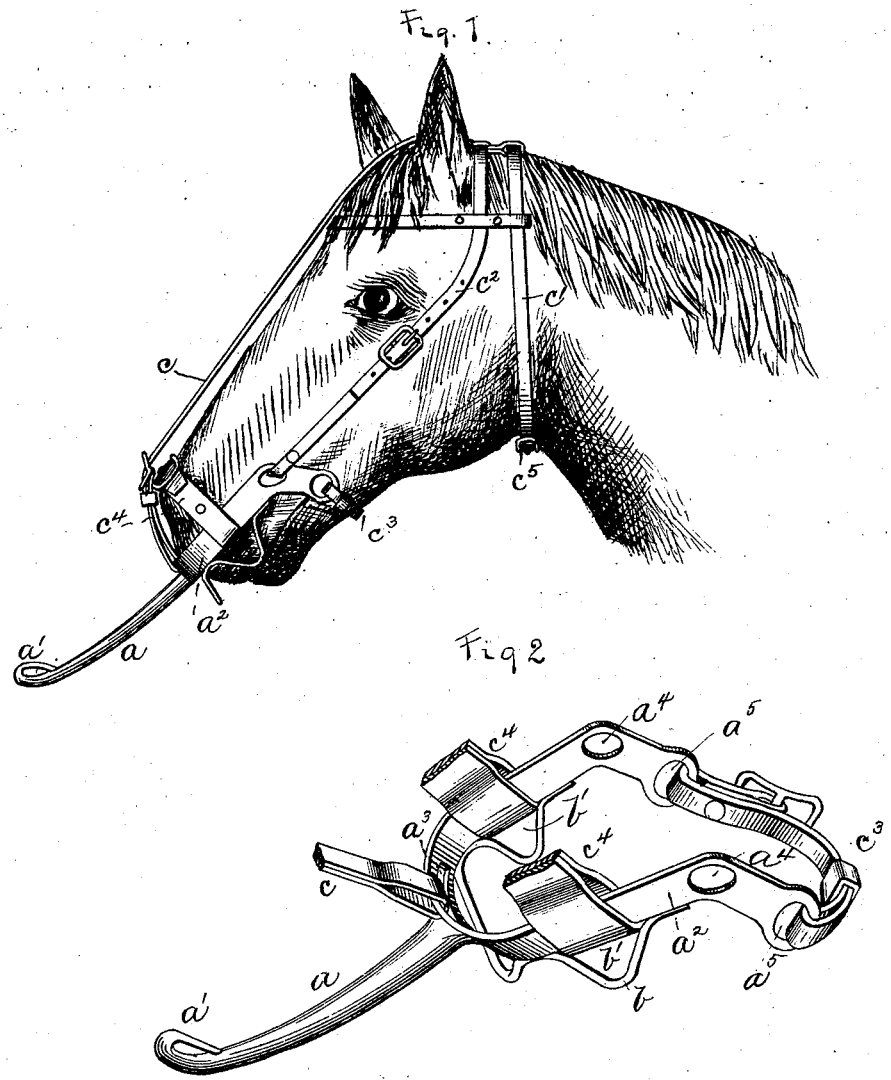

UNITED STATES PATENT OFFICE.

JOHN F. WHITESCARVER, OF MALDEN, MISSOURI.

ANIMAL-POKE.

SPECIFICATION forming part of Letters Patent No. 301,781, dated July 8, 1884.

Application filed September 4, 1883. (Model.)

*To all whom it may concern:*

Be it known that I, JOHN F. WHITESCARVER, a citizen of the United States, residing at Malden, in the county of Dunklin and State of Missouri, have invented certain new and useful Improvements in Animal-Pokes; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in animal-pokes; and it consists, essentially, in the construction of the device, as will be hereinafter described and claimed.

In the drawings, Figure 1 shows my improved poke applied to a horse, and Fig. 2 is a perspective view of the device removed.

The stale $a$ is provided at its outer end with a ring or loop, $a'$, and is supported by a yoke, $a^2$. This yoke is bent midway of its ends, at the point where the stale is joined, so as to fit around the animal's nose, and its ends are bent down at an angle, as shown. It is provided just above the stale with an opening, $a^3$. Openings $a^4 a^5$ are respectively formed at the angle or bend and at the extreme lower rear ends of the said yoke. A frame-work fender or guard, $b$, depends from the said yoke, and extends from the bent portion of the same around the front or nose part to the other bent portion, and is made of a length to project in front of the animal's mouth and prevent the animal (in case of a cow) from sucking, as well as preventing the tongue from being stuck out, as will be readily understood. I prefer to make this fender of a metallic rod bent, as shown, as thereby I provide the spaces $b' b'$, which serve as openings for the nose-strap hereinafter described. When the strap $c'$ is unbuckled at $c^5$ and the strap $c$ is unbuckled from the yoke at $a^3$, the poke may be put on the animal, and by buckling strap $c'$ at $c^5$ and the strap $c$ to the yoke it will be firmly secured, as will be seen from Fig. 1. This operation is reversed to remove the poke, as will be readily understood. The jaw-strap $c^3$ passes under the animal's jaws, and connects the rear ends of the yoke, being secured in the openings $a^5$, as shown. The nose-strap $c^4$ is passed through the openings $b'$ and over the animal's nose, passing under the strap $c$. The nose-strap and jaw-strap counterbrace, as will be readily seen, and serve to give steadiness to the poke, which is held in place by the straps $c$ $c^2$ and the throat-latch. By providing separate openings in the yoke for straps $c^2$ and the jaw-strap, the clumsy lapping of the straps one over the other is avoided, as well as the galling of the sides of the animal's head consequent on the lapping of the straps, and by bending the ends of the yoke down and securing the straps in the arrangement shown the device is held better in place than were the arms of the yoke made straight. By passing the nose-strap entirely around the yoke-arm, where it is held by the frame-work fender, the galling of the animal by the lower edge of the yoke is obviated, as well as the formation of additional strap-openings in the yoke. The ring $a'$ at the outer end of the stale proper provides means for the fastening of a rope with which to lead the animal, and the turning of the end whereby this ring is formed prevents the poke from sticking in the ground as it is moved along the same.

The uses and advantages of animal-pokes are too well known to require description.

Having thus described my invention, what I claim, and desire to secure by Letters Patent, is—

1. The animal-poke herein described and shown, composed of the yoke having its ends bent down nearly at a right angle, as shown, and provided at the point of bending and at or near said ends with strap-openings $a^4 a^5$, the stale projected forward from the middle portion of the yoke, the fender $b$, depending from the lower edge of the yoke, and extended below the forward or middle portion and sides thereof, and bent as described, forming the strap-openings $b'$, and suitable retaining-straps, substantially as described, and for the purposes specified.

2. The combination, in an animal-poke, of the yoke provided near its rear end with strap-openings $a^4 a^5$ and at its middle or forward portion with strap-hole $a^3$, and having the frame-work fender $b$ depending therefrom and below its forward and side portions, the side straps, $c^2$, adapted to be extended over the animal's head, and secured at its ends in openings $a^4$, the straps $c^3$, connecting ends of the yoke and adapted to be passed under the animal's jaw, the strap $c^4$, to be passed over the animal's nose, and the strap $c$, having one end secured to the middle forward portion of the yoke and its other end carried up and secured to straps $c^2$ $c'$, substantially as and for the purposes set forth.

In testimony whereof I affix my signature in presence of two witnesses.

JOHN F. WHITESCARVER.

Witnesses:
    G. R. ANDERSON,
    F. B. HILL.